Oct. 22, 1940.　　　G. N. PIFER　　　2,218,656
AUTOMATIC PHOTOGRAPHING MACHINE
Original Filed Dec. 5, 1934　　　7 Sheets-Sheet 1

INVENTOR.
GEORGE N. PIFER
BY
Kwis, Hudson & Kent
ATTORNEYS.

Oct. 22, 1940.    G. N. PIFER    2,218,656
AUTOMATIC PHOTOGRAPHING MACHINE
Original Filed Dec. 5, 1934    7 Sheets-Sheet 3

INVENTOR.
GEORGE N. PIFER
BY Kwis, Hudson & Kent
ATTORNEYS

Oct. 22, 1940.   G. N. PIFER   2,218,656

AUTOMATIC PHOTOGRAPHING MACHINE

Original Filed Dec. 5, 1934    7 Sheets-Sheet 4

INVENTOR.

GEORGE N. PIFER

BY Kwis, Hudson & Kent
ATTORNEYS.

Oct. 22, 1940.　　　　G. N. PIFER　　　　2,218,656
AUTOMATIC PHOTOGRAPHING MACHINE
Original Filed Dec. 5, 1934　　7 Sheets-Sheet 5
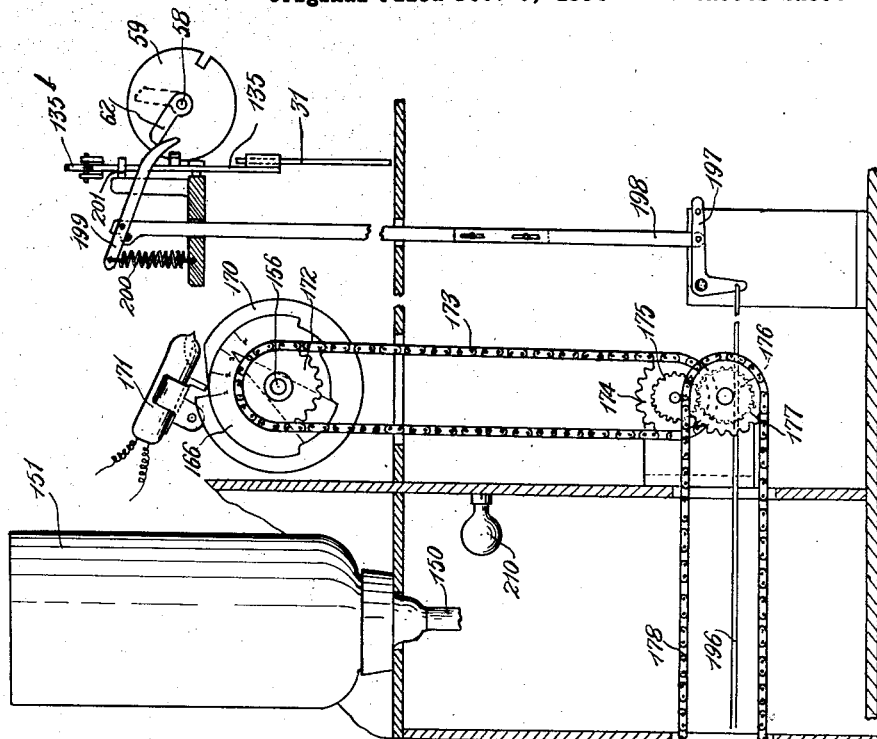
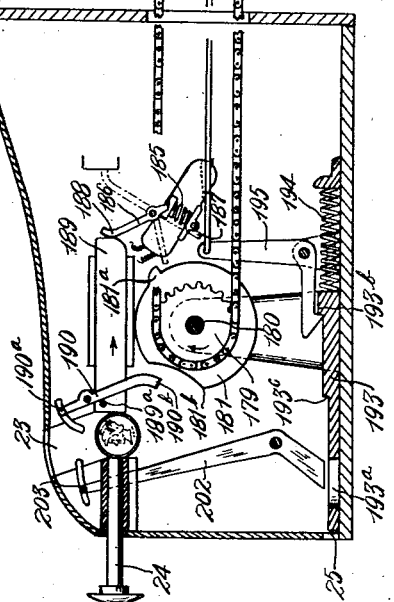
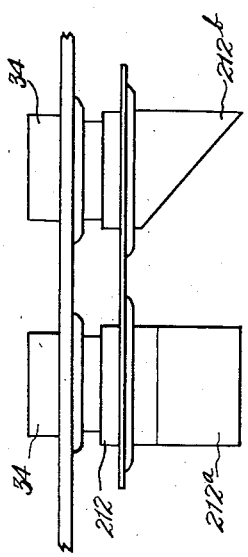
INVENTOR.
GEORGE N. PIFER
BY
Kwis, Hudson & Kent
ATTORNEYS.

Oct. 22, 1940. G. N. PIFER 2,218,656
AUTOMATIC PHOTOGRAPHING MACHINE
Original Filed Dec. 5, 1934 7 Sheets-Sheet 6

INVENTOR.
GEORGE N. PIFER
BY Kwis, Hudson & Kent
ATTORNEYS

Oct. 22, 1940.　　　　　G. N. PIFER　　　　　2,218,656
AUTOMATIC PHOTOGRAPHING MACHINE
Original Filed Dec. 5, 1934　　　7 Sheets-Sheet 7

INVENTOR.
GEORGE N. PIFER
BY
Kwis, Hudson & Kent
ATTORNEYS.

Patented Oct. 22, 1940

2,218,656

UNITED STATES PATENT OFFICE 2,218,656

AUTOMATIC PHOTOGRAPHING MACHINE

George N. Pifer, Cleveland Heights, Ohio, assignor to Speedtype, Inc., Cleveland, Ohio, a corporation of Ohio Application December 5, 1934, Serial No. 756,098
Renewed July 19, 1939

5 Claims. (Cl. 95—14)

This invention relates to automatic photographing machines.

One of the principal objects of the invention is to provide an automatic photographing machine which is efficient and rapid in operation.

A further primary object of the invention is to provide a photographing machine in which the photographic image is exposed upon sensitized material which is then developed into the finished picture.

Another important object of the invention is to provide in a photographing machine improved automatic means for developing the photographic image, which means is of such character that the operating parts are reduced to a minimum and the time consumed in the developing operation materially shortened.

A further object is to provide a photographing machine which is entirely self-operating once the mechanism thereof has been initially set in motion by the insertion into the machine of a coin or by other suitable means.

Another object is to provide a photographing machine capable of making a plurality of exposures simultaneously and of delivering simultaneously the pictures developed from said exposures.

A further object is to provide a photographing machine which will not be affected by temperature changes.

A further object is to provide a photographing machine which is set in operation by a coin and wherein if the machine for any reason fails to function or to deliver the pictures the coin will be returned to the customer.

A still further object is to provide a photographing machine which is set in operation by a coin and wherein means is provided which prevents the insertion of a coin until the machine is idle.

A further object is to provide in a photographing machine means for separating the atomized fumes from the excess developing solutions and for allowing the solutions to drain off while the fumes are carried or discharged from the machine.

Another object of the invention is to provide in a photographing machine means for projecting the lenses from tampering by the public, which means is automatically operated to expose the lenses for the taking of the pictures and is then returned to operative position to protect the lenses.

Still another object of the invention is to provide in a photographing machine means for producing in the machine imprints, advertisements, or vignetted effects upon the pictures.

Another object is to provide in a photographing machine audible or visible means which indicates the completion and delivery of the pictures.

A still further object is to provide a photographing machine capable of accomplishing the foregoing objects and which is compact, simple in construction, and constructed of relatively few parts in comparison with the results obtained.

Further and additional objects and advantages will become apparent hereinafter during the detailed description of an embodiment of the invention which is to follow and which is illustrated in the accompanying drawings, wherein Fig. 1 is a perspective view of a photographing machine embodying the invention, a portion of the side wall of the machine being broken away to show the operative parts enclosed within the cabinet of the machine;

Fig. 6 is a fragmentary irregular vertical section taken approximately on line 6—6 of Fig. 5, looking in the direction of the arrows;

Fig. 13 is an elevational view of an attachment which may be mounted on the camera lenses.

Figure 1:
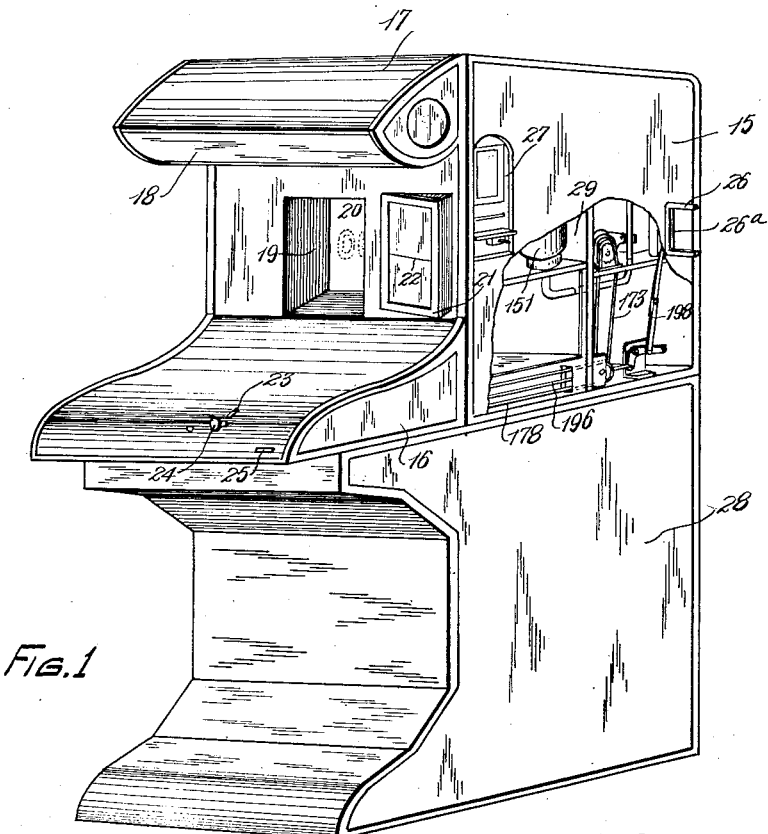
Figure 2:
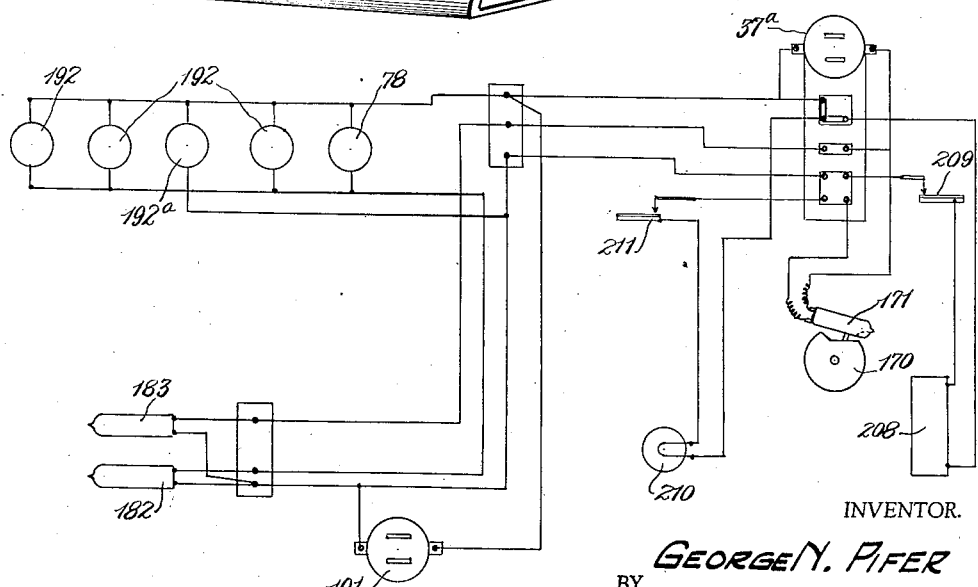
Fig. 2 is a diagram of the wiring circuits for the lights and the motor of the machine.
Figure 3:
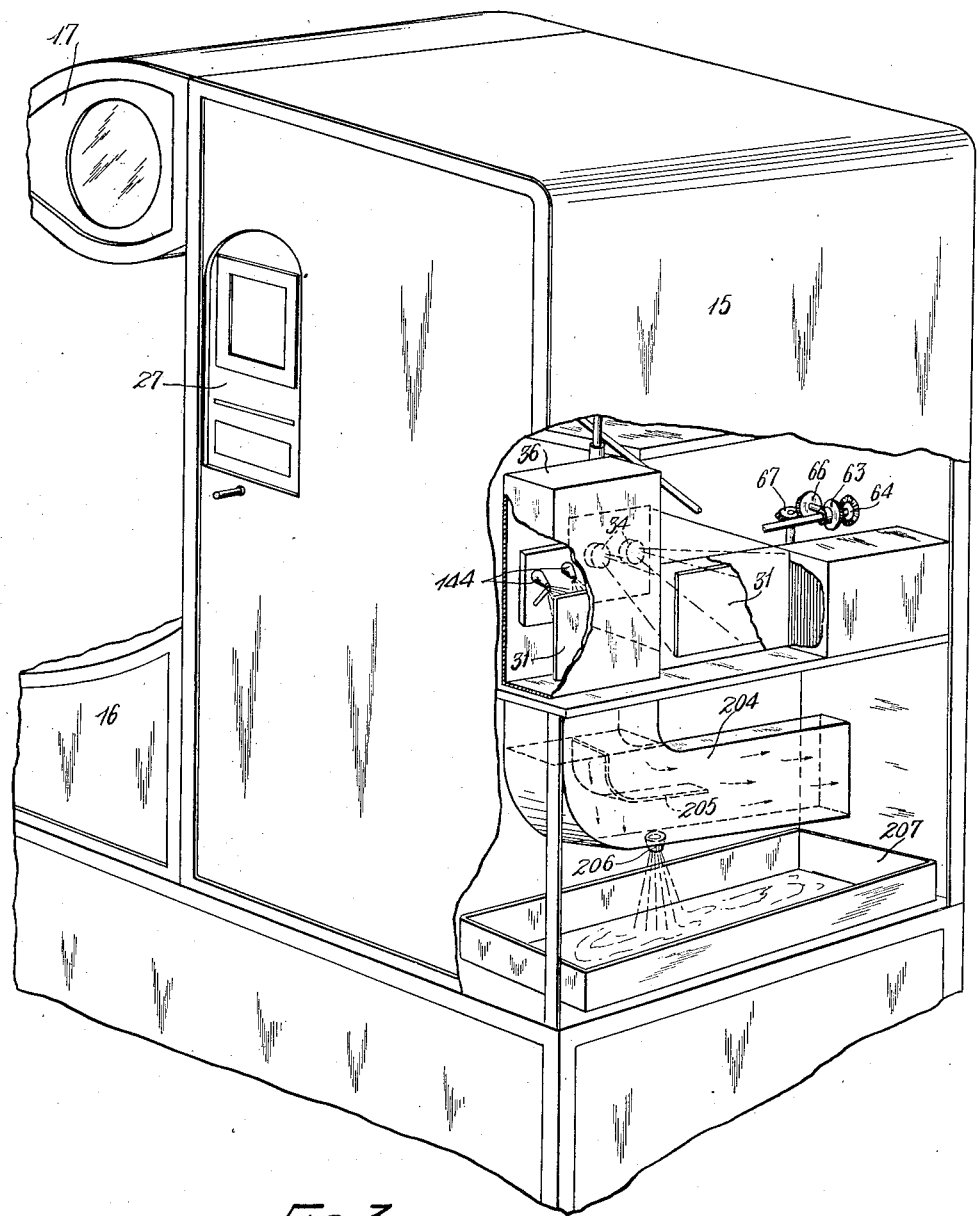
Fig. 3 is a rear perspective view of the machine taken from the righthand rear corner of Fig. 1, certain portions of the rear and side walls of the machine cabinet being broken away.
Figure 11:
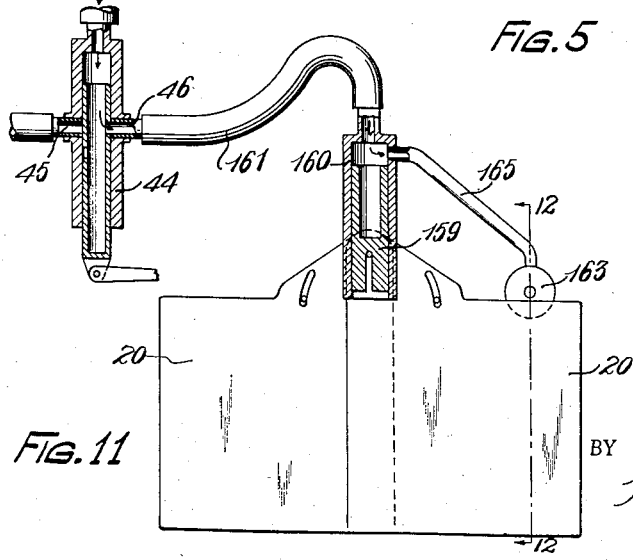
Fig. 11 is a fragmentary irregular vertical sectional view taken approximately on line 11—11 of Fig. 5, looking in the direction of the arrows.
Figure 12:
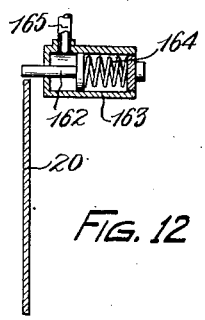
Fig. 12 is a sectional view taken on line 12—12 of Fig. 11, looking in the direction of the arrows.

Referring now to the drawings and particularly to Figs. 1 and 3 thereof, the photographing machine is housed in a cabinet including a portion 15 that contains all of the operative parts of the machine, with the exception that the coin-actuated mechanism for initiating the operation of the machine is housed in a portion 16 of the cabinet that extends forwardly from the lower front side of the portion 15. The cabinet also includes a light chamber 17 which contains a pilot lamp and a plurality of momentarily lighted lamps and extends from the upper front side of the portion 15 of the cabinet in overlying relationship to the portion 16 thereof and is provided with a suitable transparent or translucent window 18 through which light can pass so as to fall upon the patrons of the machine during the photographing operation. The front side of the portion 15 in the cabinet is provided with a substantially centrally disposed inwardly tapered funnel 19 (see Fig. 5), the inner end of which is normally closed by movable shutters 20 (see Figs. 5, 11 and 12), which shutters protect the lenses of the camera and prevent unauthorized tampering with said lenses, as will later become apparent.

It will be understood that the cabinet is so proportioned that patrons will be properly distanced from the camera lenses for the taking of good pictures provided the patrons follow the directions which are displayed in a suitable and convenient location on the machine.

The front wall of the portion 15 of the cabinet may be provided with a focusing or locating mirror 21 having an eye centering line 22 extending transversely thereof and by means of which patrons may ascertain the correct position to assume for the photographing operation. The portion 16 of the cabinet, in a position located conveniently for patrons, is provided with a coin receiving slot 23 and a plunger 24 which moves the coin into the actuating mechanism for starting the machine in operation. The front side of the portion 16 of the cabinet is also provided with an opening 25 through which a coin returning slide can project when a coin is inserted into the machine and the machine fails to operate or fails to deliver a picture, as will be more fully explained hereinafter.

The side wall of the portion 15 of the cabinet is provided with a frame 26 projecting laterally from the wall and registering with an opening 26a in the wall through which the finished picture is ejected, said frame being for the purpose of receiving and supporting the finished picture until patrons can remove the same therefrom. If desired, a mechanism 27 for dispensing folders or other devices for embellishing the finished pictures may be provided.

The cabinet of the machine is illustrated in the present drawings as supported upon a base 28 which may be in the form of a hollow receptacle which can be employed for storage purposes. Of course, where the floor space is limited, the machine can be mounted upon a counter or other suitable support instead of upon the base 28.

It will be understood that preferably the machine will be arranged at such a height as to enable patrons to sit upon an adjustable stool to have their pictures taken. It will be understood further that a suitable background, preferably a collapsible or knockdown screen will be employed with the machine, but since the stool and background form no part of the present invention, the same have not been illustrated herein.

In the portion 15 of the cabinet on each side of the tapered funnel 19 are chambers 29 in which the containers for the developing solutions are arranged and to which reference will hereinafter be made. The portion 15 of the cabinet is also provided with a magazine chamber 30 which contains the supply of sensitized cards 31 upon which the pictures are produced, while adjacent to the chamber 30 and behind the window 19 is the photographing chamber 32 having a transverse partition 33 mounting the lenses 34 and a centrally disposed partition 35 extending rearwardly from the partition 33 and forming in effect separate chambers for each of the lenses 34. The cabinet is also provided to the left of the photographing chamber 32, as viewed in Fig. 5, with a closed developing chamber 36, and suitable movable gates are provided for sealing the chamber 36 and are retracted automatically to allow the cards to pass into and out of the developing chamber, as will be hereinafter explained.

Figure 10:
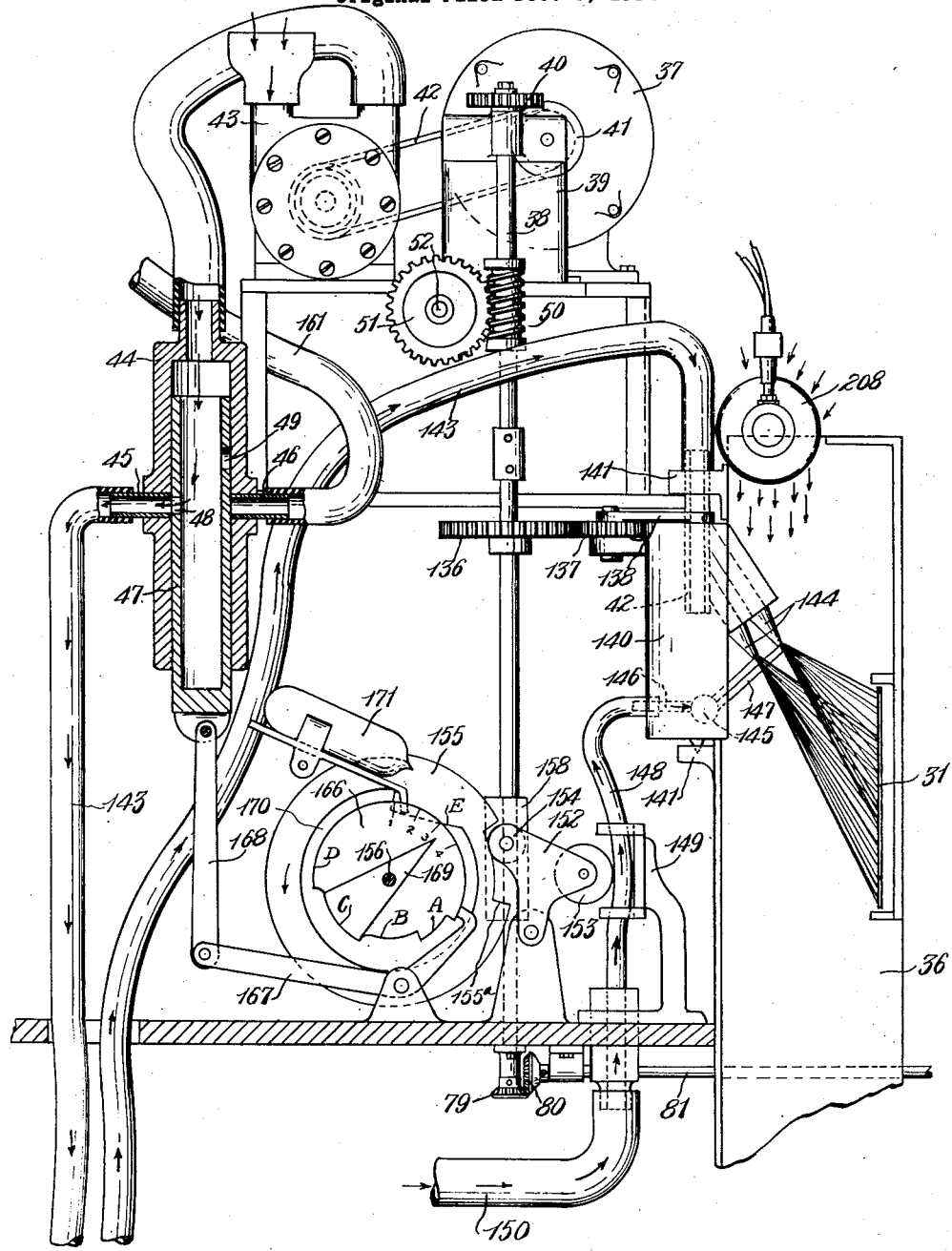
Fig. 10 is a fragmentary vertical sectional view taken approximately on line 10—10 of Fig. 5, looking in the direction of the arrows.

All of the operating parts of the machine are driven by a suitable electric motor 37, see Figs. 10 and 6, which motor 37 drives a vertically extending shaft 38 through a suitable reduction unit 39 that includes a gear which meshes with a gear 40 fixed on the upper end of the shaft 38. The shaft of the motor 37 is provided with a pulley 41 for the driving belt 42 of an air pump 43, the outlet of which is connected by a suitable conduit to a valve casing 44 having two outlet passages 45 and 46 (see Figs. 10 and 11), later to be referred to. A tubular plunger 47 is slidably mounted in the valve casing 45 and is closed at its lower end and provided intermediate its ends and on opposite sides with ports 48 and 49, the port 48 being adapted to be brought into registry with the outlet 45 while the outlet 46 is closed, and the port 49 being adapted to be brought into registry with the outlet 46 while the outlet 45 is closed, there being an intermediate position of the valve plunger 47 in which both outlets are closed, as will be more fully explained hereinafter.

The shaft 38 below the gear 40 at its upper end is provided with a worm 50 which meshes with a worm wheel 51 fixed on the end of a substantially horizontal shaft 52 which carries at its opposite end a bevel gear 53 (see Figs. 4 and 10). The bevel gear 53 meshes with a bevel gear 54 fixed on one end of a rotatable shaft 55 that has a bevel gear 56 fixed to its opposite end which gear meshes with a bevel gear 57 fixed on a horizontal shaft 58 arranged adjacent the rear of the machine and is constantly rotated during the operation of the machine (see Fig. 4). The shaft 58 has fixed thereto intermediate its ends discs 59 and 60 which are spaced longitudinally of the shaft and located respectively adjacent the developing chamber 36 and the photographing chamber 32. The discs 59 and 60 are provided with slots 61 extending inwardly in a radial direction from the circumference of the disc for a purpose later to be explained.

The shaft 58 adjacent its lefthand end, as viewed in Fig. 4, has fixed thereto a finger 62 which rotates with the shaft and serves a purpose later to be specified. The shaft 58 adjacent its righthand end, as viewed in Fig. 4, has fixed thereto a gevel gear 63 which meshes with a bevel gear 64 fixed on one end of a short horizontal shaft 65 extending in a lateral direction with respect to the shaft 58. The shaft 65 has fixed to the end thereof opposite the end carrying the gear 64 a bevel gear 66 which meshes with a bevel gear 67 fixed to the upper end of a shaft 68 extending vertically into the magazine chamber 30 and carrying at its lower end a cam 69 located between spaced arms 70 which project laterally from a movable feed plate 71 (see Figs. 4 and 5) slidably arranged in suitable guides in the magazine chamber 30. The feed plate 71, on the side thereof opposite to the side carrying the arms 70 and adjacent its upper and lower righthand edges, is provided with projecting portions or lugs 72 adapted to engage the righthand edge, as viewed in Figs. 4 and 5, of the most forward sensitized card of a stack of cards 31 arranged in the chamber 30 and held against the feed plate 71 by means of a presser plate 73 pivotally connected to the end of a bell-crank lever 74 which extends through an opening in the rear of the chamber 30 and has its opposite end pivoted to a bracket 75 projecting laterally from the outer side of the lefthand wall of the chamber 30, as viewed in Fig. 5. A spring 76 connected to the lever 74 and to the frame maintains the presser plate 73 tightly against the most rearward card of the stack of cards 31.

In order that the pictures produced in the machine can be formed thereon imprints, advertisements, or vignetted effects, it is proposed to form in the feeder plate 71 a stencilled name, advertisement, or other configuration, or, if desired, to have a portion of the feeder plate formed of transparent material to produce a vignetted effect upon the sensitized card and surrounding the picture. In order to illustrate this feature, the plate 71 in Fig. 4 is shown as provided with a stencilled name 77 the letters of which constitute openings in the plate, wherefore the area of the foremost sensitized card in engagement with the feeder plate and lying behind the stencilled name 77 will be exposed with each operation of the machine to the action of a momentarily lighted lamp 78 arranged in the chamber 30, said light being arranged in the same circuit as the lamps in the light chamber 17 and which are employed to furnish the necessary light for the photographing operation, as will later be explained.

Figure 4:
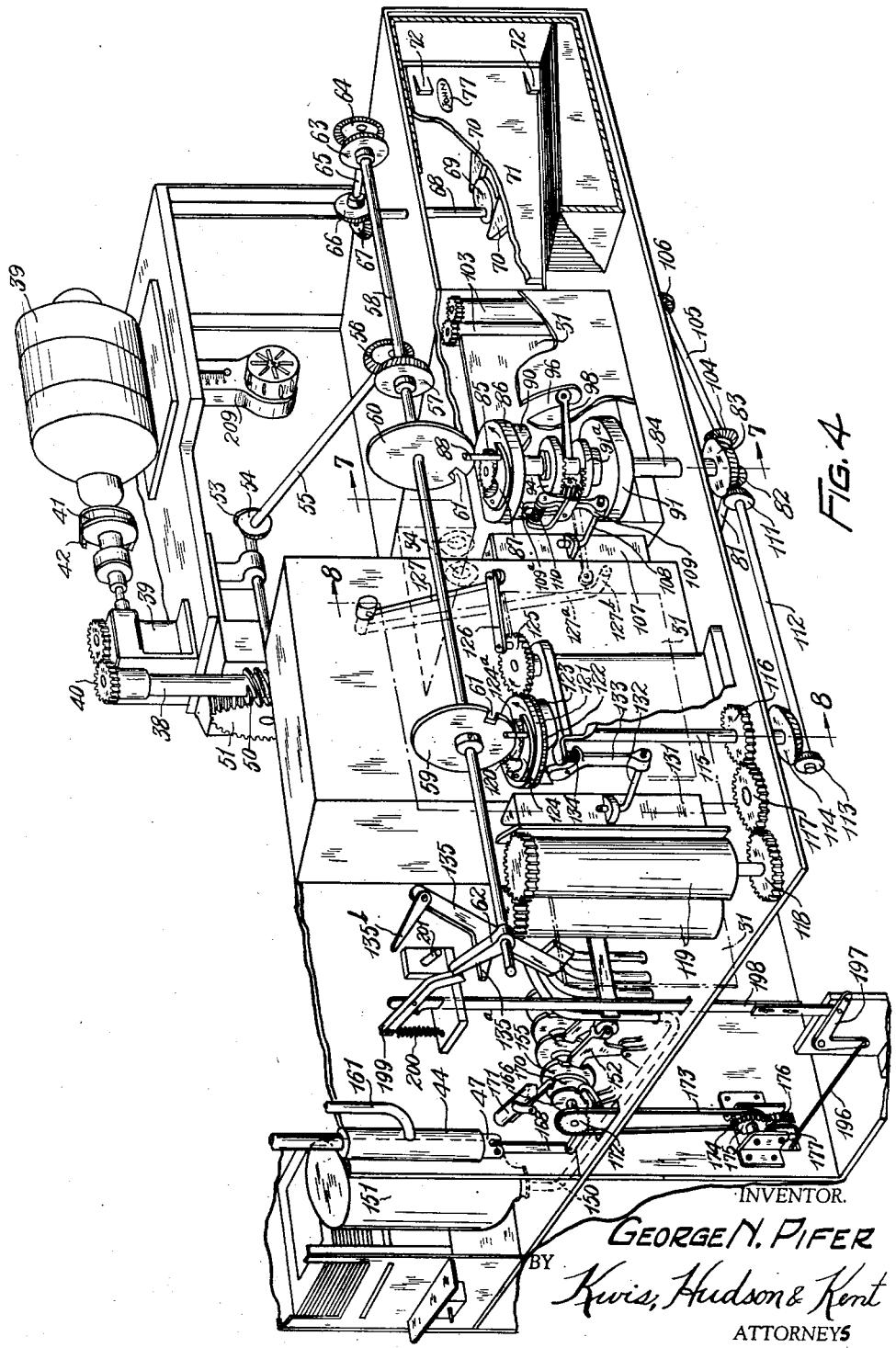
Fig. 4 is a rear perspective and somewhat schematic view of certain of the operating parts of the machine.

It will be understood that in the operation of the machine the cam 69 will make one complete revolution during the operative cycle, wherefore, the feeder plate 71, after a slight period of non-movement as the machine starts to operate, will have a complete movement of reciprocation from its extreme righthand position, as viewed in Fig. 4, toward the left and then back to said righthand position. The cam 69 is so designed that the movement of the plate 71 toward the left, that is, toward the photographic chamber does not commence until the foremost sensitized card has had the stencilled name imprinted thereon and will be so timed that when the sensitized card is moved by the plate it will not enter the photographic chamber until after the sensitized card which is already in the photographic chamber and which has received the photographic image has commenced its movement from the photographic chamber toward the developing chamber, as will later be explained.

Figures 7, 8, 9:
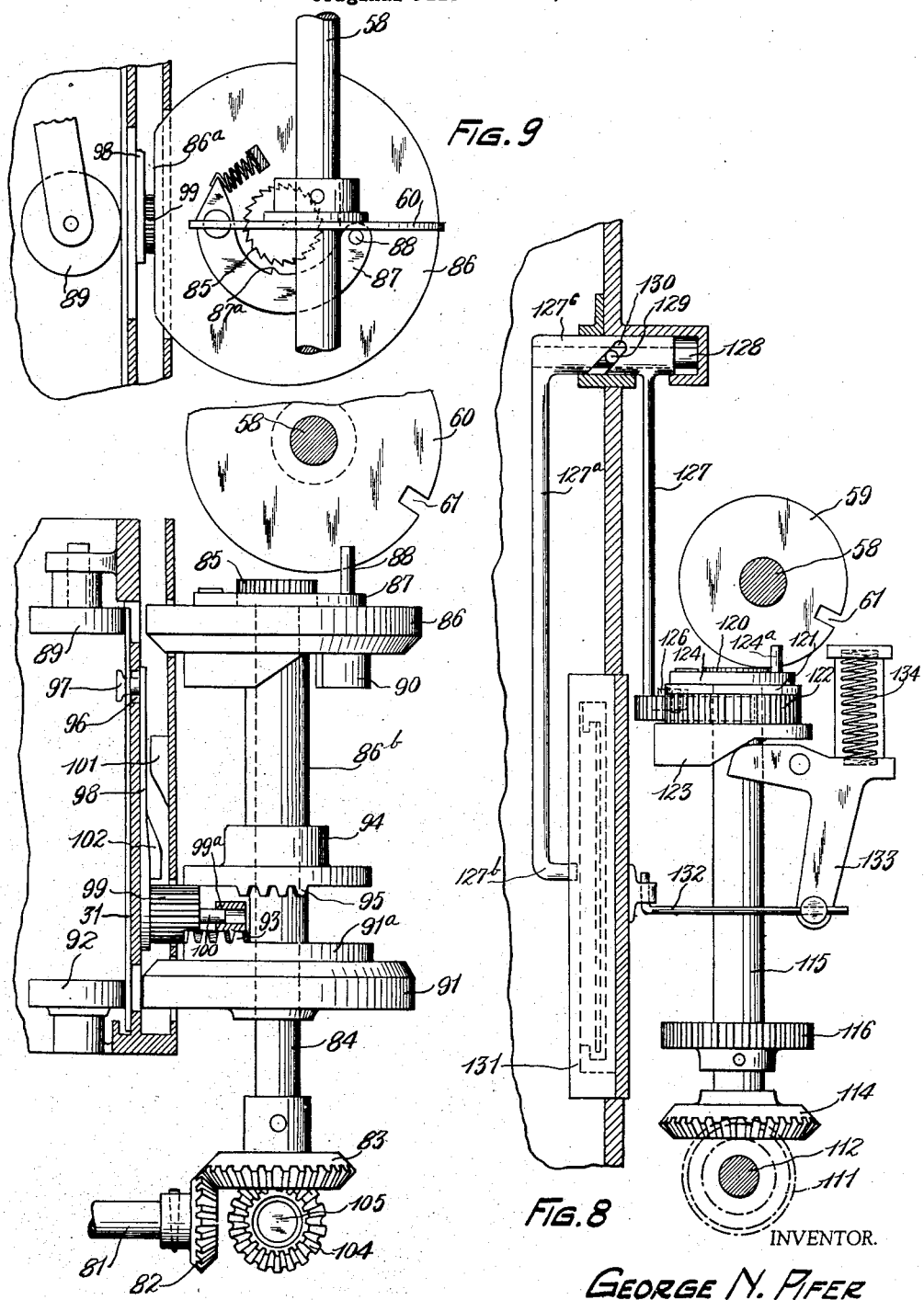
Fig. 7 is a fragmentary irregular vertical sectional view taken approximately on line 7—7 of Fig. 4, looking in the direction of the arrows.
Fig. 8 is a fragmentary irregular vertical sectional view taken approximately on line 8—8 of Fig. 4, looking in the direction of the arrows.
Fig. 9 is a top plan view of Fig. 7.

The lower end of the shaft 38 has fixed thereto a bevel gear 79 which meshes with a bevel gear 80 fixed on one end of a horizontal and rearwardly extending rotary shaft 81 which carries at its opposite and rearward end a bevel gear 82, see Figs. 4, 7, and 10. The bevel gear 82 meshes with a bevel gear 83 fixed on the lower end of a vertically extending rotary shaft 84, see Figs. 4, 5, and 7.

Figure 5:
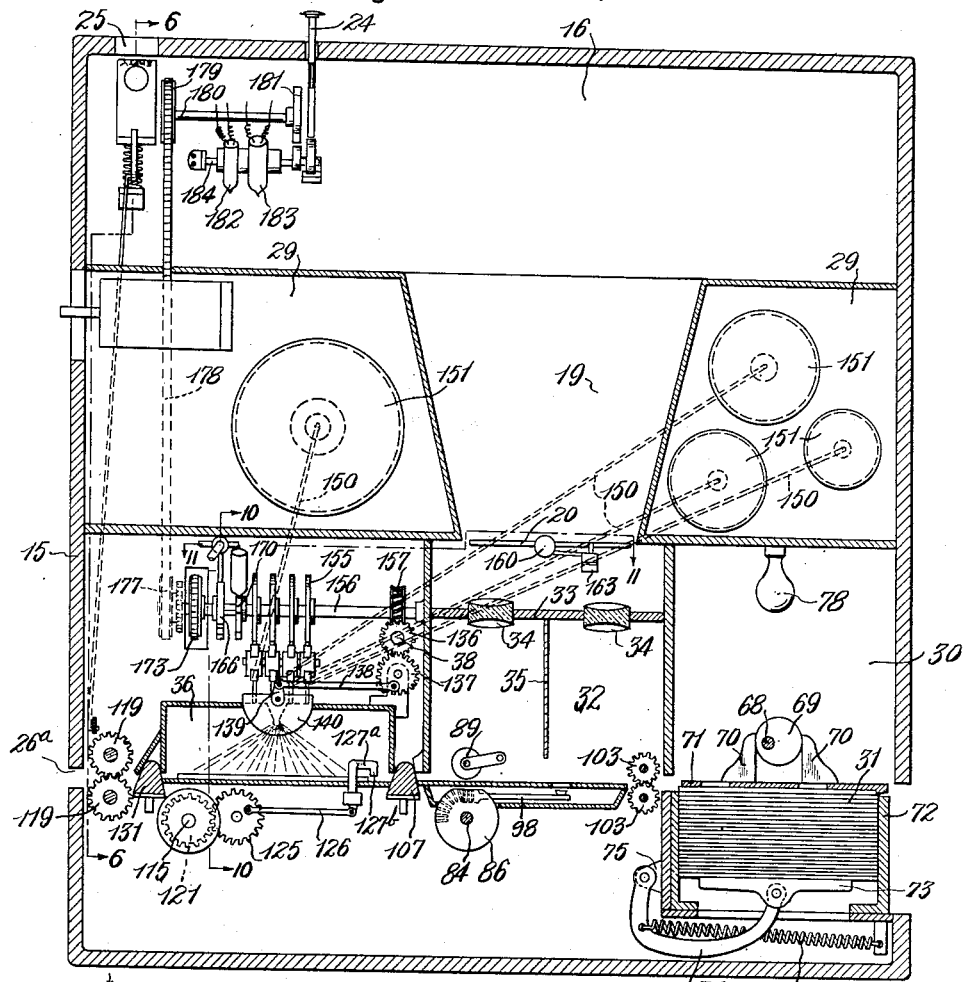
Fig. 5 is a transverse horizontal sectional view and shows certain of the operative parts of the machine in section and other of said parts in top plan.

The shaft 84 lies outside of and is parallel with the rear wall of the photographic chamber 32, being located adjacent the lefthand rear corner of the chamber, as viewed in Fig. 5. The upper end of the shaft 84 has fixed thereto to rotate with the shaft a circular ratchet or gear member 85, while just below the ratchet or gear member 85 is a disc member 86 which is carried by a sleeve 86b loosely mounted on shaft 84 so that the latter may have rotation relative thereto and independently thereof. Pivoted on the upper face of the disc 86 is a pawl 87, see Figs. 4, 7, and 9, which is provided at its end opposite to its pivot with a vertically extending pin 88, said pawl being normally urged in a counter-clockwise direction by a suitable coil spring, wherefore, the tooth of the pawl will engage in the teeth of the ratchet or gear 85, with the result that the gear 85 and the disc 86 will rorate as a unit with the shaft 84. However, the disc 60 on the shaft 58 is so located as to be engaged by the pin 88 at a certain point in the operative cycle, which engagement effects a release of the pawl tooth 87a from the ratchet 85. At another point in the operative cycle of the machine, the pin 88 will register with and pass through the slot 61 in the disc 60, whereupon the pawl tooth 87a will engage with the ratchet 85 and remain in such relation until the disc 86 has traveled through a predetermined arc of revolution. The disc 86 is of such diameter that it extends through an opening in the rear wall of the photographic or camera chamber, as clearly shown in Figs. 7 and 9, the periphery of the disc 86 being provided with a flattened portion 86a which is for the purpose of providing clearance to allow the sensitized card upon which the photographic image has been imprinted to pass between the disc 86 and an idler roller 89 arranged within the photographic chamber.

The disc 86, on its under side, is provided with an axially projecting circularly extending cam 90 for a purpose later to be explained. The sleeve 86b has fixed to its lower end a second disc 91 of the same diameter as the disc 86 and extending through an opening in the rear wall of the photographic chamber, the periphery of the disc 91 being provided with a flattened portion similar to the flattened portion 86a of the disc 86, wherefore, at certain periods in the operative cycle, a clearance is provided for a sensitized card between the periphery of the disc 91 and the periphery of an idler roller 92 arranged within the photographic chamber and lying in vertical alignment with the idler roller 89. A mutilated gear member 91a is fixed to the sleeve 86b at the upper surface of the disc 91 and has a plurality of axially extending gear teeth 93 forming a gear segment, in this instance, there being four of the teeth 93. The sleeve 86b intermediate the discs 86 and 91 has fixed thereto a mutilated gear 94 provided on its under side with a number of axially extending gear teeth 95, the teeth 95 corresponding in number to the teeth 93 on the member 91a, but being displaced circumferentially with respect to the teeth 93.

The rear double wall of the photographic chamber 32 is provided with an arcuate slot 96, see Figs. 4 and 7, through which extends a headed finger 97 arranged on the end of a lever 98 which carries at its opposite end a pinion 99 mounted to slide and rotate on a stub shaft 100 that is fixedly secured to or carried by a bracket 99a, as shown in Fig. 7. The pinion 99 is arranged between the gears 94 and 91a, and, during the rotation of such gears, will be rotated in one direction by the gear teeth 93 and in the opposite direction by the gear teeth 95 to cause the lever and the finger 97 to oscillate in opposite directions with the finger traveling through the slot 96. The finger 97 is arranged to engage behind the righthand edge of a sensitized card in the photographic chamber 32 and to move the card toward the developing chamber at a certain point in the operative cycle of the machine. It will be appreciated that, in order to provide clearance for the card to enter the photographic chamber, it is necessary that the finger 97 be retracted out of the chamber, and, to this end, the lever 98 and the outer face of the inner wall and the inner face of the outer wall of the double rear wall of the photographic chamber are provided with cooperating cam elements 102 and 101.

The sensitized cards, as previously explained, are moved from the magazine chamber by the feeder plate 71 until the forward edge of the card passes between and is seized by the oppositely rotating feed rollers 103, see Fig. 4, said rollers being driven from the shaft 84 by means of a beveled gear 104 meshing with the bevel gear 83 and fixed on the end of a shaft 105 to the opposite end of which is fixed a gear 106 meshing with a gear on the lower end of one of the rollers 103, as will be well understood.

The photographic chamber 32 is connected with the developing chamber 36 by means of a passage which can be closed by a movable gate 107 which seals the chambers 32 and 36. The outer side of the gate has connected thereto a pull rod 108 which in turn is secured to the lower end of a pivoted lever 109 that has an arm 109a engaged by the cam 90 on the under side of the disc 86 to rock the lever in the proper direction at a predetermined point in the operative cycle to cause a retraction of the gate 107 and an opening of the passage between the photographic and developing chambers.

A spring 110 is provided to rock the lever 109 in the opposite direction to that in which it is rocked by the cam 90 and to normally maintain the gate 107 in passage closing and sealing position.

The gear 83 on the lower end of the shaft 84 also meshes with a bevel gear 111 fixed on the righthand end, as viewed in Fig. 4, of a shaft 112, the lefthand end of which has fixed thereto a bevel gear 113 which meshes with a bevel gear 114 fixed on the lower end of a vertically extending shaft 115 arranged outside of and adjacent the lefthand end of the developing chamber 36. The shaft 115 has fixed thereto a gear 116 meshing with an idler gear 117 which in turn meshes with a driving gear 118 for a pair of oppositely rotating squeegee feed rollers 19 arranged intermediate the exit for the developing chamber and the slot in the side wall of the portion 15 of the cabinet which registers with the picture receiving frame 26. The shaft 115 lies below the disc 59 on the shaft 58 and has fixed at its upper end a circular ratchet or gear 120 fixedly mounted on the shaft 115 and below the ratchet 120 is a disc member 121 which includes a circular gear member 122 and below the gear member 122 a cam member 123. A pawl 124 similar to the previously described pawl 87 is pivotally mounted on the upper side of the disc 121 and the tooth of the pawl is held normally in engagement with the teeth of the ratchet 120. The pawl 124 adjacent its free end is provided with an upstanding pin 124a which, during certain parts of the operative cycle, engages the disc 59 so that the tooth of the pawl 124 is held out of engagement with the teeth of the ratchet 120. It will be understood, of course, that, as the disc 59 rotates with the shaft 58, the slot 61 in the disc will come into registry with the pin 124a, whereupon the pawl will move inwardly and its tooth will engage in the ratchet 120, at which time the disc 121, gear 122, and cam 123 will rotate with the shaft 115. A gear 125 is rotatably mounted upon a stub shaft carried by a suitable bracket and is located so as to intermesh with the gear 122. A crank arm 126 is pivotally connected to the gear 125 and to the downwardly extending arm 127, see Figs. 4 and 8, of a rocker member which extends through the wall of the developing chamber and is provided with a downwardly extending arm 127a located in said chamber and having at its end a laterally turned portion 127b, see Figs. 4 and 8. That portion of the rocker member which extends through the wall of the developing chamber is rockably supported in an opening in the wall and in a tubular extension formed on the wall upon a fixed shaft 128 carried by the tubular extension and having a pin 129 projecting laterally therefrom and engaging in a cam slot 130 formed in the portion 127c of the rockable member that extends through the wall of the developing chamber. It will be seen that rotation of the gear 125 will impart rocking movement to the rockable member so that the arm 127a of the member, which is within the developing chamber, will swing in an arcuate path, the lower end 127b of said arm engaging behind the sensitized card in the developing chamber to move the latter toward the exit. It will be appreciated that the portion 127b of the rockable member must first be moved out of the path of the card as it enters the developing chamber and then must be moved in the opposite direction to position the portion 127b behind the edge of the card. These movements of the rockable member are brought about through the medium of the pin 129 and the cam slot 130, it being apparent that, as the rockable member oscillates, the pin will cause a shifting movement of said member toward or away from the rear wall of the developing chamber.

The developing chamber 26 at its lefthand end is provided with an exit opening that is normally closed and sealed by a tapered gate 131, see Figs. 5 and 8. A pull rod 132 is secured to the rear side of the gate and to the downwardly extending arm of a bell crank lever 133 that is pivotally mounted upon a suitable bracket and has its other arm underlying the cam 123, see Figs. 4 and 8. A spring 134 engages a projecting portion of the bell crank lever 133 to normally retain the lever in such position that the gate 131 will be held closed and will seal the exit to the developing chamber.

When the cam 123 is rotating with the shaft 115 during a certain period of the operative cycle, the lever 133 will be rocked in an anti-clockwise direction by the cam and the gate 131 retracted to allow the card with the completed picture thereon to pass outwardly of the developing chamber and between the rollers 119 which in turn move it into the card receiving frame 26. As the card is moved by the rollers 119 into the frame 26, it engages a projecting tab on a lever 135 so as to rock said lever in a clockwise direction. As soon as the card has passed beyond the latter, the card will return to its normal vertical position by means of gravity. The lever 135 intermediate its ends is provided with an arm 135a projecting to the left, as viewed in Fig. 4, and at its upper end has pivoted to it a finger 135b which also projects toward the left, as viewed in the drawings. The purpose of the lever 135 and its associated parts will be made more apparent hereinafter.

The shaft 38, which might be termed the main drive shaft of the machine, is provided below the worm 50 and substantially midway between the ends of the shaft 58 with a gear 136 fixed to the shaft and meshing with a gear 137 rotatably mounted upon a suitable bracket, as indicated in Figs. 5 and 10. A connecting arm 138 is pivotally connected to the gear 137 and to a crank arm 139 carried by an oscillatable mixing and atomizing unit 140 suitably fulcrumed at its upper and lower ends on brackets 141 carried by one of the fixed parts of the machine. The atomizing unit 140 is semi-circular in cross-section and is arranged to extend through an opening into the developing chamber 36, the opening and the unit 140 being so proportioned that the unit, while free to oscillate on its fulcrum points, will substantially seal the opening. The atomizing unit 140 is provided with an inlet passage 142 adjacent its upper end to which is connected a flexible conduit 143 that has its opposite end connected to the passage 45 of the valve casing 44.

One or more nozzles 144 extend from the passage 142 in a downwardly inclined direction and into the developing chamber 36. In the lower end of the unit 140 there is provided a compartment 145, called the mixing cell, extending in a direction transverse to the pivotal axis of the atomizing unit. The mixing cell 145 communicates with a plurality of passages 146 extending laterally therefrom (see Fig. 10) and corresponding in number to the number of solutions used in the developing, washing, and fixing of the picture, in the present instance there being four passages 146. The mixing cell 145 also is in communication with tubes 147 extending diagonally upwardly from the unit 140 into the developing chamber 36 and terminating adjacent the outer ends of the nozzles 144, as clearly shown in Fig. 10.

The passages 146 are connected to flexible conduits 148 which pass through the spaced arms of U-shaped bracket members 149 and are connected to larger flexible conduits 150 that extend to the bottles 151 in the chambers 29 and which contain the developing, washing, and fixing solutions. When the machine is operating and a picture is being developed in the developing chamber, air is being forced into the passage 142 through the conduit 143 by the pump 43 and at the same time one or more of the solutions are drawn into the mixing cell 145 from the conduits 148 and are being atomized from the tubes 147 and blown by the air from the nozzles 144 upon the sensitized card that is in the developing chamber.

It is necessary and desirable that during the developing operation certain of the conduits 148 be held closed so that the developing solutions to which they are connected will not be drawn into the mixing cell 145. In order to provide for this closing off and opening of the conduits 148 substantially triangular levers 152 are pivotally mounted upon upstanding brackets arranged in the cabinet adjacent each of the conduits 148, said levers 152 being provided with rollers 153 extending between the spaced arms of the U-shaped brackets 149 and arranged, when the levers are rocked in one direction, to tightly press against the conduits 148 and to clamp the same upon the base of the brackets 149 to thereby close the conduits and prevent the passage of solutions therethrough. The rocking of the levers 152 is brought about in timed sequence by means of rollers 154 carried by the levers and engaging the circumference of spaced discs 155, which are provided with suitably located circumferentially extending peripheral notches 155a, see Fig. 10. The discs 155 are fixed to and rotate with a shaft 156 which is driven by means of a worm wheel 157 fixed thereto and meshing with a worm 158 on the shaft 38. It will be seen that as the discs rotate the rollers 154 carried by the levers 152 will travel around the circumference of the discs until they come to the notches 155a, whereupon the pressure upon the levers 152 will be released and the clamping action of the rollers 153 removed from the conduits 148 so that the solution can flow through the conduit from the bottles 151 and into the mixing cell 145. As previously intimated, the conduits 148 are sequentially opened and closed during that portion of the operative cycle of the machine in which the picture is developed.

When the machine is idle the plunger 47 in the valve casing 44 is so arranged that the parts 48 and 49 will both be out of registry with the passages 45 and 46. Upon the initiation of the operation of the machine it is necessary that the shutters 20 be unlocked and opened so that the lenses 34 can imprint the photographic image upon the sensitized card in the photographing chamber 32. The shutters 20 are pivotally carried by the lower end of an air operated piston 159, see Fig. 11, movably mounted in a cylinder 160 that is connected by a conduit 161 with the passage 46 of the valve casing 44. The shutters 20, when in closed position, are locked by means of a pin 162 which engages over the top edge of one of the shutters, it being noted that the shutters are mounted to move in unison, the pin 162 being arranged in a cylinder 163 and having a head forming a piston in the cylinder and also an abutment for a spring 164. The spring 164 normally holds the pin 162 in a position to lock the shutters 20 and it will be seen that as soon as air passes through the conduit 161 and into the cylinder 160, it can also pass into the cylinder 163 by means of a conduit 165 connected to the cylinder 163 at the end opposite to the spring 164 and to the cylinder 160 above the upper end of the plunger 159. Air passing through the conduit 161 and into the cylinders 160 and 163 will retract the pin 162 to unlock the shutters and will move the plunger 159 downwardly in the cylinder 160 to open the shutters.

In order to control the plunger 47 so as to cause the ports 48 and 49 to register with the passages 45 and 46 at the proper moments during the operation of the machine, a cam 166 is fixed on the shaft 156, while the upturned end of a lever 167 engages the periphery of the cam, as clearly shown in Fig. 10. The lever 167 is pivotally mounted intermediate its ends upon a pin carried by a suitable bracket and has its opposite end pivotally connected to a link 168, the upper end of which is pivotally connected to the lower end of the plunger 47. In Fig. 10 the upturned end of the lever 167 is shown in a position with respect to the cam that it has just prior to the completion of the developing operation and it will be noted that the port 48 of the plunger 47 is in registry with the passage 45, wherefore, air is passing through the conduit 143 to the mixing unit while the port 49 is out of registry with the passage 46 and no air is passing to the cylinders 160 and 163. As the machine operates further to deliver the picture from the developing chamber to the picture receiving frame 26, the end of the lever 167 engages the step A of the cam 166, whereupon the plunger 47 moves downwardly so that both the ports 48 and 49 are out of registry with the passages 45 and 46 and this is the condition that maintains while the machine is idle, it being noted, however, that the step A of the cam is of such length that the picture will be delivered while the lever is in engagement therewith.

As soon as the machine has again been placed in operation the rotation of the cam 166 brings the end of the lever 167 into engagement with the step B of the cam, which results in the port 49 of the plunger registering with the passage 46 and air being transmitted from the pump 43 through the conduit 161 to the cylinders 160 and 163 to unlock the shutters and open the same. The length of the step B is such that the shutters will remain open the proper length of time for the photographic exposure. In order that the time for the exposure may be adjusted to suit various conditions, the cam 166 is provided with an adjustable member 169 which can be moved to various positions to vary the length of the cam step B, suitable indicia being provided on the cam to show the adjustment of the member 169. The machine being in operation and the cam 166 continuing to rotate in an anti-clockwise direction, the end of the lever 167 passes from the step B of the cam onto the step C, whereupon both of the ports 48 and 49 are out of registry with the passages 45 and 46, at which time the shutters 20 fall closed by gravity and the locking pin 162 overlies the top edge of one of the shutters. This is the period during which the card, upon which the photographic image has been imprinted, is being transmitted from the photographing chamber 32 into the developing chamber 36.

As soon as the card has been positioned in the developing chamber 36 the cam 166 will have rotated sufficiently far to bring the end of the lever 167 onto the step D of the cam at which time the port 48 is in registry with the passage 45 and air is passing to the atomizing nozzles 144 of the unit 140. It will be noted that the step D of the cam 166 extends circumferentially of the cam a substantial distance inasmuch as the developing operation involves, relative to the entire operation of the machine, a considerable period of time. The shaft 156 also has secured thereto a cam 170 with the circumference of which cooperates a finger carried by a pivotally mounted mercury switch 171, the cam 170 being provided with a step E which allows the switch 171 to swing downwardly to open the switch, see Fig. 10. The step E of the cam 170 is in cooperation with the finger of the switch 171, while the machine is idle and during a short period at the start of the operation of the machine, as will later be explained.

The end of the shaft 156 is provided with a sprocket 172 receiving a chain 173 that extends through an opening in one of the horizontal partitions of the cabinet and downwardly to a sprocket 174 fixed to a shaft carried by suitable bearing brackets and also having a gear 175 secured thereto. The gear 175 meshes with a gear 176 fixed on a second shaft carried by said bearing brackets, while said second shaft also has fixed thereto a sprocket 177. A chain 178 travels around the sprocket 177 and extends forwardly into the portion 16 of the cabinet and adjacent the front end of which it extends around a sprocket 179 fixed on a horizontal shaft 180 which is rotatably mounted in suitable supporting brackets, see Figs. 5 and 6. The opposite end of the shaft from the end bearing the sprocket 179 has fixed thereto a cam 181. Suitable mercury switches 182 and 183 of well known construction are carried on a shaft 184 rockably supported in suitable brackets in the cabinet and extending parallel to the shaft 180. The shaft 184 can be rocked from one extreme position wherein the switches 182 and 183 are closed or to the other extreme position wherein the switches are open, a suitable spring 185 being provided to maintain the shaft and the switches in either one of said positions and effective after the shaft has been moved past center position. A pivoted lever 186 is employed for effecting the rocking of the shaft 184, said lever having an arm 187 adapted to be engaged by a part of the cam 181 and also an arm 188 which is engaged by a slidable member 189 of the coin actuating mechanism. It will be noted that, when a coin is inserted in the slot 23 and the plunger 24 moved inwardly, the coin connects the plunger and the member 189 so that the latter can be pushed inwardly in its guides in a righthand direction, as viewed in Fig. 6, whereupon the arm 188 of the lever 186 is engaged by the member 189 and the lever rocked to cause the shaft 184 and the switches 182, 183 carried thereby to be snapped over to the "on" or closed position, it being understood that the switches are shown in Fig. 6 in the "off" or open position.

The member 189 is provided with a pin 189a which engages a pivoted lever 190 having at its upper end an arm 190a and at its lower end a curved portion 190b. It will be noted that, since the pin 189a engages the lever 190 below its pivot, movement of the member 189 to the right, as viewed in Fig. 6, causes the lever 190 to rock in an anti-clockwise direction, wherefore the arm 190a will be positioned in the coin slot 23 and prevent the insertion of a coin therein while the lower curved portion 190b of the lever will be moved into a position to be engaged by a portion of the periphery of the cam 181 and rides thereon during the rotation of the latter. It will be understood that when a coin is inserted in the slot 23 and the plunger 24 is moved to the right, as viewed in Fig. 6, so as to shift the member 189 to a position to move the switches 182, 183 to the "on" or closed position, the circuit from the main plug 191 to the motor plug 37a is completed through the switch 183 while the circuit from the main plug 191 to the lamp 78 in the magazine chamber 30 and the lamps 192 in the light chamber 17 is complete through switch 182. The pilot lamp 192a in the light chamber 17 is not controlled by the switch 182 but remains lighted at all times that the machine is connected to an electric current source. As soon as the switch 183 moves to the "on" position, the motor 37 starts in operation and the operative parts of the machine begin to function in the operative cycle. The operation of the machine effects a rotation of the cam 181 in a clockwise direction, as indicated by the arrow in Fig. 6, which, after an interval of time sufficient for the photographing operation, brings the finger 181a of the cam into engagement with the arm 187 of the lever 186 to cause the lever to rock toward the left, as viewed in Fig. 6, and to shift the switches 182 and 183 to the "off" or open position. When the lever 186 moves toward the left, the member 189 will also move toward the left, but the lever 190 will be held in a position such that the arm 190a will obstruct the coin slot 23, it being noted that the periphery of the cam 181 is engaged behind the curved portion 190b of the lever 190 to prevent the lever swinging by gravity until it engages the pin 190a. At the close of the operative cycle, the curved cutout portion 181b of the cam 181 is brought into a position wherein the lever 190 is free to swing by gravity so that the arm 190a will move out of the coin slot 23, as shown in Fig. 6. It will be understood that the switch 183 remains closed at the start of the operative cycle a sufficient length of time to allow the cam 170 rotating in an anti-clockwise direction to move to the position wherein the step E of the cam has passed out of engagement with the finger carried by the pivotally mounted mercury switch 171, whereupon said switch 171 is moved to the "on" or closed position so that the circuit to the motor continues to be closed after the switch 183 has been opened.

It has been explained how provision is made in the machine to prevent the insertion of a coin into the coin slot 23 during the operation of the machine, and it will now be explained how, in case the machine fails to deliver a finished picture, the patron's money will be automatically returned to him and the slot 23 again closed against the insertion of a coin therein.

A coin returning slide 193 is mounted in the front end of the portion 16 of the cabinet in a position to be projected outwardly of the cabinet through the slot 25, a spring 194 acting to normally urge the slide 193 through the slot 25. The slide 193 is provided with a recess 193a in which the coin is placed when the machine is serviced, and with a stepped shoulder 193b adjacent the rear end of the slide. The slide 193 is maintained within the cabinet against the action of spring 194 by the hooked end on the horizontal arm of a pivoted bell crank lever 195. The upper end of the vertical arm of the lever 195 is connected to a rod 196 which extends toward the rear of the machine and is connected at its rear end to the vertically extending arm of a pivoted bell crank lever 197 that has its horizontally extending arm connected to a vertically extending strap 198 the upper end of which is pivotally connected to a detent 199 (see Figs. 4 and 6). The strap 198 is connected to the detent 199 intermediate the ends of the latter, wherefore the pivotal connection between these members may be said to be a floating pivot. A spring 200 secured to the lefthand end of the detent 199, as viewed in the drawings, acts to normally rock the detent in an anti-clockwise direction for a purpose which will soon be apparent. The righthand end of the detent 199 is provided with a downwardly curved portion which cooperates with the finger 62 fixed on the rotating shaft 58. When the machine is in operation, and prior to the discharge of the finished picture, the lever 135 will be swung by gravity and by the engagement of the finger 62 with the arm 135a to substantially vertical position, at which time the finger 135b pivoted to the upper end of the lever 135 rests upon a fixed pin 201 and lies beneath the detent 199. As the card bearing the finished picture is ejected from the machine by the rollers 119 at the close of the operative cycle, the card engages the tab at the lower end of the lever 135 and swings said lever in a clockwise direction to the position shown in Fig. 4, with the result that the finger 135b is withdrawn from beneath the detent 199 and off the pin 201. Consequently, when the finger 62 engages the curved righthand end of the detent 199, the detent will merely be swung about its pivotal connection to the strap 198 without causing any movement of the bell crank lever 197, it being noted that the strap 198 is formed with provision for a lost motion connection. However, in case a card is not ejected from the machine, the lever 135 will remain in its vertical position with the finger 135b over the pin 201 and beneath the detent 199. Then as the finger 62 on the shaft 58 swings into engagement with the righthand end of the detent 199, the finger 135b forms a fixed fulcrum for the detent, with the result that the detent is rocked upon such fulcrum by its engagement with the finger 62 and the strap 198 is pulled upwardly to rock the bell crank lever 197 in an anti-clockwise direction and to pull the rod 196 rearwardly. The rearward movement of the rod 196 rocks the bell crank 195 in a clockwise direction, thus causing the hook at the end of the vertical arm of the bell crank 195 to move out of engagement with the shoulder 193b of the slide 193, whereupon the spring 194 projects said slide through the opening 25, and the recess 193a with the coin therein is accessible for removal of the coin by the patron. The forward movement of the slide 193 causes a shoulder 193c located intermediate the ends of the slide to engage with the lower end of a pivoted lever 202 to rock said lever and to bring an arm 203 at the upper end of the lever into the coin slot 23 to prevent the insertion of a coin therein.

It is necessary to provide means for carrying off from the developing chamber excess developing, fixing, and washing solutions, as well as to dispose of the fumes emitted from the atomized solutions. Therefore, a substantially L-shaped relatively large conduit 204 is provided at the rear of the machine and has the upper end of its vertically extending portion connected to the developing chamber 36. A substantially L-shaped baffle 205 (see Fig. 3) is arranged within the conduit 204 at the junction of the arms thereof, while in the base of the conduit 204 is an opening 206 lying above a pan 207. The excess solutions pass into the conduit 204 and from the latter through the opening 206 into the pan 207, while the fumes are dispelled from the righthand open end of the conduit 204 to the atmosphere, as shown in Fig. 3. The efficiency of the conduit 204 is increased by utilizing the heat of an electric heater 208 arranged above and communicating with the developing chamber 36. The primary purpose of the electric heater 208 is to maintain a uniform temperature in the machine and particularly in the developing chamber thereof, said heater being controlled by a thermostat 209. The heat from the heater 208 is induced into the developing chamber 36 by the air passing from the nozzles 144. The positively forced air currents in the developing chamber enter the conduit 204 and, because of the baffle 205, venturi action is created which effectively causes the fumes to be carried from the machine through the conduit 204, while the excess solutions pass into the pan 207. It is desirable that the solutions in the bottles 151 be maintained at a substantially constant temperature, and to this end a suitable heater, such as a lamp heater 210, is arranged in the cabinet beneath the compartments 29, such heater being controlled by a thermostat 211.

In order to bring out more clearly the novel features of the present invention and the advantages inherent therein, the operation of the machine during a full operative cycle will now be explained.

Assuming that the main plug 191 of the machine is connected to a source of electrical energy, the pilot lamp 192a in the light chamber 17 will be lighted and the heaters 208 and 210 will be functioning unless their respective thermostats have temporarily disconnected the heaters from the circuit. A sensitized card from the stack of cards 31 will be in the photographic chamber 32, having been moved there at the finish of the last operative cycle, while the feeder plate 71 with the card pressed against the rear side thereof will be in the position shown in Fig. 5. The patron, after seating and positioning himself properly in front of the machine, using the mirror 21 to attain the correct location, inserts a coin in the slot 23 and pushes inwardly on the plunger 24 to throw the switches 182 and 183 to the "on" position, whereupon the motor 37 commences its operation and the light 78 in the magazine chamber 30 and the lights 192 in the light chamber 17 are momentarily lighted. The sensitized card 31 that is immediately behind the feeder plate 71 has that portion covered by the stencilled name exposed to the light 78. Prior to starting the machine in operation, the end of the lever 167 is at the lefthand end of the step A of the cam 166, wherefore, as soon as said cam commences its rotation, the end of the lever engages the step B to shift the plunger 47 to bring the port 49 into registry with the passage 46 to cause air to flow to the cylinders 160 and 163 to first release the lock for the shutters and then open the shutters 20. The shutters 20 being opened, the sensitized card in the photographic chamber 32 is exposed to the image passing through the camera lenses 34 so that said images will be imprinted on the sensitized card simultaneously. The length of time of the exposure is determined by the length of the step B of the cam 166 since as soon as the end of the lever 167 leaves the step B and engages the step C of the cam, the plunger 47 moves so as to place the port 49 and the passage 46 out of registry, whereupon the shutters 20 close by gravity and are locked in such position by the pin 162. It is at this moment that the cam 181 of the coin actuating mechanism throws the switches 182 and 183 to the "off" position to disconnect the circuit to the lamps 78 and 192, it being remembered that just prior to this time the switch 171 has been moved to the "on" position by the cam 170 so that there is no interruption in the operation of the motor 37.

The card being now between the flattened portions of the peripheries of the discs 86 and 91 and the idle rollers 89 and 92, the slot 61 of the disc 60 rotates to a position such that the pin 88 will pass therethrough and the tooth of the pawl 87 engages the ratchet 85 to effect a rotation of the discs 86 and 91. The rotation of the discs 86 and 91 now moves the flattened portions of their peripheries away from the card, with the result that the card is engaged by the discs and moved toward the developing chamber until free from idle rollers 89 and 92. Approximately at this time the teeth of the mutilated gear 94 engages the pinion 99 to cause the lever 98 to swing and cam forward on cam 101 into the slot 96 in a counter-clockwise direction. The finger 97 on the end of the lever engages the rear edge of the card in the photographic chamber and moves said card toward the left, that is, toward and into the developing chamber. The rotation of the disc 86 causes the cam 90 to engage the 5 arm of the lever 109 to move the lever in a direction such that the gate 107 will open at the right time to allow the card to pass into the developing chamber from the photographic chamber, after which the spring 110 moves the lever 109 in the opposite direction to effect a closing of the gate. The teeth of the mutilated gear member 91a now engage the pinion 99 to rotate the latter in a direction to move the lever 98 in a clockwise direction, and as the lever 98 approaches the limit of its movement in the clockwise direction, the cam member 102 engages the lever so that it is moved rearwardly with respect to the wall of the machine and the finger 97 thereby positioned out of the path of the card which is now entering the photographic chamber from the magazine chamber. The foremost card in the storage chamber is moved by the feeder plate 71 in turn moved by the cam 69 until the card is engaged by the feed rolls 103 which move it until its forward portion lies between the discs 86 and 91 and the idler rollers 89 and 92. The sensitized card that has been moved into the photographic chamber is now in a position to have an image imprinted thereon the next time the machine is operated.

The end of the lever 167 has now moved onto the step D of the cam 166 to cause a shifting movement of the plunger 47 to bring the port 48 into registration with the passage 45 that has the conduit 143 connected thereto, with the result that air from the pump 43 is now passing into the mixing cell 140 and being ejected from the nozzles 144, it being remembered that the atomizing unit 140 is being constantly oscillated since it is driven from the gears 136, 137 by the crank arm 138. At this time certain of the conduits 148 which are connected to the bottles containing the developing, fixing, and washing solutions are closed by the rollers 153 on the pivoted levers 152 while one or more of the other conduits 148 are open, allowing the solutions to flow to the mixing cell and to be atomized and sprayed upon the sensitized portions of the card 31. As previously stated, the discs 155 are provided with peripheral notches 155a that are displaced circumferentially of the disc with respect to each other, wherefore, the various conduits 148 are sequentially opened and closed to allow the proper solution to be atomized upon the picture. Since all of the solutions flow into a common mixing cell 145 in the atomizing unit 140, two or more of these solutions may be simultaneously atomized and blown upon the card, or one solution at a time may be atomized and sprayed upon the card. It is possible to reduce the time involved in the complete operative cycle by mixing and atomizing two or more of the solutions simultaneously or by having the atomizing of the various solutions arranged so as to overlap.

As soon as the developing, washing, fixing, and washing of the picture has been completed, the end of the lever 167 moves upon the step A of the cam 166, wherupon the plunger 47 is shifted so that the port 48 as well as the port 49 is out of registry with the passages 45 and 46, thus stopping the flow of pressure fluid to the nozzles 144. At this time the slot 61 of the disc 59 is in a position such that the pin 124a passes therethrough and the pawl 124 is connected to the ratchet 120 with the disc 121, gear 122, and cam 123 rotating with the shaft 115. The gear 122, being in mesh with the gear 125 through the connecting arm 126, rocks the member 127 so as to cause the end portion 127b of the inner arm 127a of the member to move behind the rear edge of the card, after which the rockable member swings to propel the card toward the exit of the developing chamber and in between the squeegee feed rolls 119, the revolution of the gear 125 then causing the member 127a to rock back to its original position. The cam 123, at the proper time to allow the card to pass from the developing chamber to the rollers 119, rocks the lever 133 in a direction to open the gate 131. The rollers 119 not only move the card onto the picture receiving frame 26 through the opening 26a, but also squeeze the excess moisture from the card. As soon as the card has passed the gate 131, the cam 123 will move to a position in which the spring 134 is free to rock the lever 133 and effect a closing of the gate. At this time, the pin 124a again engages the disc 59 and the pawl 124 is disengaged from the ratchet 120. As the card passes outwardly of the machine, it engages the tab at the lower end of the lever 135, rocks said lever in a clockwise direction, withdrawing the pivot finger 135b from the pin 201 and from beneath the detent 199. Consequently, when the finger 62 engages the end of the detent 199, there will be no release of the coin returning slide since the detent is mounted on a floating pivot, as previously explained. At this time the switch 171 moves to the "off" position and the circuit to the motor is interrupted and the machine is in condition to commence another operative cycle.

In Fig. 13 there is illustrated an attachment 212 which may be mounted upon the camera lenses 34 and which comprises two angular prisms 212a and 212b designed to function at different angles so as to produce images which are distorted in length and/or breadth, and thereby permit the taking of caricature pictures.

Although a preferred embodiment of the machine has been illustrated and described herein, it will be understood that the invention is not to be limited thereto except in so far as the scope of the appended claims so limits it.

Having thus described my invention, I claim:

1. In a photographing machine, means for exposing a sensitized element and means for developing said exposed sensitized element comprising a mixing cell, means for introducing severally or in combination developing, washing and fixing solutions into said cell, means for atomizing and spraying the solutions in said cell upon the exposed sensitized element, and means for oscillating said cell during the developing operation to thoroughly cover the exposed surface of said element with the atomized solutions.

2. In a photographing machine, means for effecting simultaneously a plurality of exposures upon a sensitized element, and means for developing simultaneously a plurality of pictures upon the sensitized element, comprising an oscillatable mixing cell, means for introducing into said cell developing, fixing and washing solutions severally or in combination, and means for atomizing and spraying the solutions in said cell upon the sensitized element.

3. In an automatic photographing machine, a developing chamber, means for introducing into said chamber pressure fluid for atomizing the developing, fixing and washing solutions, and a funnel connected to and communicating with said chamber and adapted to carry off the fumes generated by said solutions, the pressure fluid introduced into said chamber creating a forced circulation through said funnel.

4. In an automatic photographing machine, a photographic chamber having a camera lens therein, a shutter for closing said chamber and protecting said lens, a developing chamber, means for moving a previously exposed sensitized element from said photographic chamber into said developing chamber, and means for sequentially utilizing pressure fluid to open said shutter for the photographic operation, to close and lock the shutter and then to atomize and spray upon the sensitized element in the developing chamber developing, washing and fixing solutions.

5. In an automatic photographing machine, a camera, a shutter for protecting the camera lens, an air nozzle for atomizing the developing, fixing and washing solutions, and means sequentially operative to direct air pressure to said shutter to open the same for the photographic exposure, then to stop the flow of air pressure to said shutter and direct it to said air nozzle.

GEORGE N. PIFER.